US00RE46065E

(19) United States
(12) Reissued Patent
Crawford

(10) Patent Number: US RE46,065 E
(45) Date of Reissued Patent: Jul. 12, 2016

(54) FOAM SWABS FOR CLEANING FIREARMS

(71) Applicant: SUPER BRUSH LLC, Fullerton, CA (US)

(72) Inventor: Brian David Crawford, Ware, MA (US)

(73) Assignee: Super Brush LLC, Fullerton, CA (US)

(21) Appl. No.: 14/631,237

(22) Filed: Feb. 25, 2015

Related U.S. Patent Documents

Reissue of:
(64) Patent No.: 8,661,724
Issued: Mar. 4, 2014
Appl. No.: 13/598,006
Filed: Aug. 29, 2012

(51) Int. Cl.
*F41A 29/02* (2006.01)
*F41A 29/04* (2006.01)

(52) U.S. Cl.
CPC *F41A 29/04* (2013.01); *F41A 29/02* (2013.01)

(58) Field of Classification Search
CPC ..... F41A 29/04; F41A 29/02
USPC ..... 42/95; 15/104.03, 104.05, 104.165, 15/104.16, 104.19; 134/22.1
See application file for complete search history.

(56) References Cited

U.S. PATENT DOCUMENTS 143,139 A * 9/1873 Gould ..... 15/104.16
172,996 A * 2/1876 Gregg ..... 15/104.16
399,452 A * 3/1889 Tomlinson ..... 15/104.19
1,213,383 A * 1/1917 Kiessig ..... 15/104.165
1,786,520 A * 12/1930 Darling ..... 15/104.19
2,544,150 A * 3/1951 Franklin ..... F41A 29/02 125/23.01
3,064,294 A * 11/1962 Stocking ..... 15/104.19
3,205,518 A * 9/1965 Romaine ..... 15/104.165
4,291,477 A * 9/1981 Carlton ..... F41A 29/02 15/104.19
4,873,778 A * 10/1989 Stipp ..... F41A 29/02 15/104.165
2006/0162223 A1* 7/2006 Whipple ..... 42/95
2009/0007352 A1* 1/2009 Komine ..... B08B 1/00 15/104.16
2009/0283115 A1* 11/2009 Dentico ..... F41A 29/02 134/22.1

FOREIGN PATENT DOCUMENTS

GB 26890 0/1914
GB 212229 7/1924
WO 03069260 8/2003

OTHER PUBLICATIONS

Atkinson, Brendan, "How to clean a firearm", SSAA National Media & Publications—Free Stories, website article, Sporting Shooters' Association of Australia (SSAA), Unley SA, Australia.

* cited by examiner

*Primary Examiner* — Jeffrey R Jastrzab
(74) *Attorney, Agent, or Firm* — Donald S. Holland, Esq.; Holland & Bonzagni, P.C.

(57) ABSTRACT

Applicant has disclosed a foam swab for cleaning and lubricating firearms. In the preferred embodiment, the invention comprises: a molded plastic shank having a threaded free end and a series of parallel rings spaced between parallel spacers; and a foam cover, preferably made of polyurethane, thermally bonded to the spacers. To clean a firearm, solvent or lubricant is applied to the foam cover. Then the threaded end can be screwed into a gun cleaning rod and the foam swab drawn through a firearm bore.

10 Claims, 4 Drawing Sheets

NEW

NEW

FOAM SWABS FOR CLEANING FIREARMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application claims priority from Applicant's U.S. Provisional Patent Application Ser. No. 61/661,523, filed Jun. 19, 2012. Applicant claims the benefit of priority from that provisional application. Applicant also hereby incorporates the entire disclosure from that earlier application herein by reference.

FIELD OF THE INVENTION

This invention relates generally to firearms and, more particularly, to methods and devices for cleaning and lubricating the firearms.

BACKGROUND OF THE INVENTION

As explained by Brendan Atkinson, a technical advisor to the Australian publication for shooters and hunters, "Australian Shooter":

"Firearms work better, shoot straighter and last longer if they are properly maintained and treated with respect. A large part of this maintenance involves the proper cleaning and care of the working mechanisms and the all-important bore.

When a firearm is discharged, particles of burnt powder and primer residue are left in the bore, along with copper or lead-fouling depending on what bullets are being used. The next shot causes the bullet to pass over the fouling and so on for subsequent shots. If the firearm is neglected and many shots fired, a sandwich build-up of fouling can occur in the bore, especially just in front of the chamber. This, in effect, reduces the size of the bore and can result in a rise in pressure—in extreme cases, copper-clad bullets can be swaged down by this fouling so they exit the bore slightly undersized, and this is why fouling causes accuracy to drop off as more shots are fired . . . . Shotgun shooters have an additional problem, in that plastic fouling from the wads used to hold the shot can sometimes leave a very stubborn type of fouling in the bore. Special brushes are available to help remove this."

Firearm maintenance involves keeping the gun and all working parts free of carbon, metal particles (lead, copper, brass), and any other contaminant or foreign substance that may cause the gun to malfunction or to wear out prematurely. Firearms should generally be cleaned after firing them, and a deep cleaning should be performed periodically. Oiling and lubricating the firearms is also necessary to ensure their proper functioning, to keep them from rusting, and to condition the metal components.

Firearms are partially or fully disassembled, when applicable, to properly clean them. A revolver usually does not have to be disassembled, while a semi-automatic handgun usually does.

Some tools typically used in modern firearm cleaning are: a "bore snake" to clean the barrel; a brass jag (attached to a rod) with a speared cotton patch to clean the barrel; and different solvents and gun oils to remove contaminants and to lubricate and protect the components of the firearm. Other tools, such as a screwdriver, are sometimes needed for disassembly.

A bore snake is a tool used to clean the inside (bore) of the barrel of a firearm. It resembles a short section of rope with a smaller, weighted cord attached to one end to help feed the bore snake through the barrel. A bore snake often has one or more integrated brushes to help clean the barrel, and may also be used to apply lubricant. It is an alternative to using a cleaning rod and patches to clean the barrel of a firearm. Bore snakes are made in different sizes for different calibers and gauges of guns.

Bristle brushes are sometimes used to clean bores, followed by a lubricated soft rag. Bristles, if not used with a bore-guide, can destroy rifling and leave residue. A bore-guide prevents the cleaning rod from contacting the sensitive throat area of the barrel.

After a thorough cleaning, the next step in maintaining a firearm is to properly lubricate it. Lubrication is as important, if not more so than cleaning. In order to keep the firearm from malfunctioning, proper lubrication is essential and proper oiling protects metal parts from corrosion as well.

Cotton and wool mops are used, as a final step, to soak up oil, leftover solvent, debris or other moisture to protect the bore of a shotgun, rifle or handgun. These mops/swabs help ensure accuracy at the range and in the field.

Q-Tips® cotton swabs are often used to clean, oil or grease parts of the firearms, such as the breech or receiver. As good as Q-Tips® swabs are for getting into small or tight places, like the outside folds of a person's ears, the cotton swabs can leave fibers behind on a firearm's metal edges.

Accordingly, it is a primary object of the present invention to provide a simpler method and apparatus for cleaning firearms—one that requires fewer steps and parts.

It is another general object to provide a simple device for cleaning and lubricating the bores of firearms without worrying about harming any rifling.

SUMMARY OF THE INVENTION

Applicant has disclosed an improved device for cleaning and lubricating firearms, both long guns (rifles and shotguns) and handguns. In the preferred embodiment, the invention comprises: a molded plastic shank having a threaded free end (which can be screwed onto a cleaning rod) and a series of parallel rings spaced between parallel cylinders; and a foam cover, made of polyurethane foam, formed over the rings and thermally bonded to the shank. The foam cover can get into any rifling for cleaning and lubricating.

BRIEF DESCRIPTION OF DRAWINGS

The above and other objects and advantages of the present invention will become more readily apparent upon reading the following description and drawings in which.

DETAILED DESCRIPTION OF PREFERRED EMBODIMENT(S)

Applicant has created foam swabs to replace the traditional jag, patch, and mop for cleaning and lubricating the inside of firearms, both long guns and handguns. Super Brush LLC markets this new product under the trademark "Bore-Tips".

Figure 1:
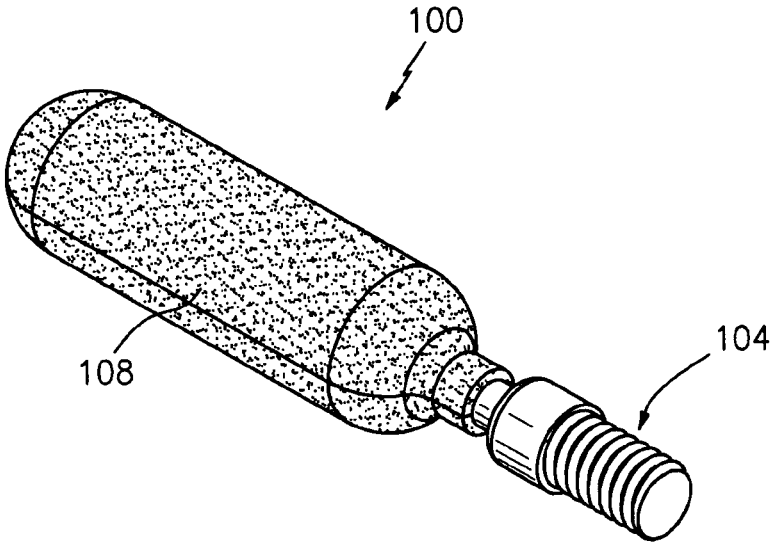
FIG. 1 is a perspective view of a foam swab constructed in accordance with Applicant's invention.
Figure 2:
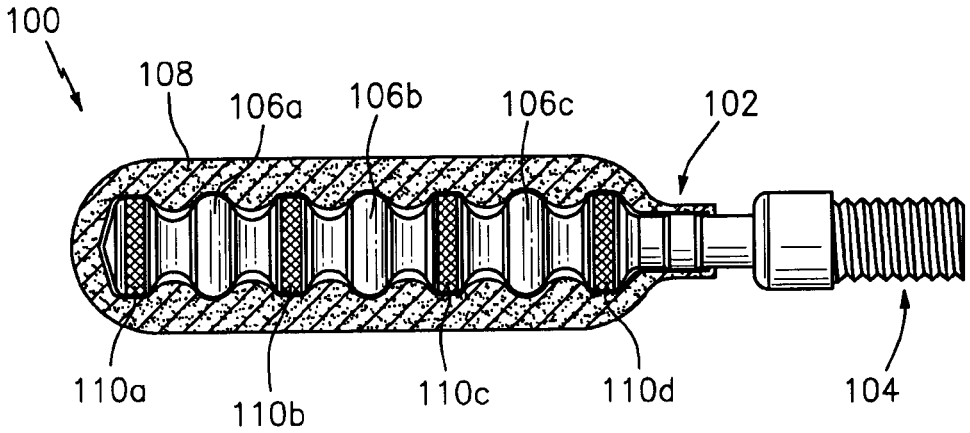
FIG. 2 is a side plan view of FIG. 1 with portions of a foam cover removed.
Figure 3A:
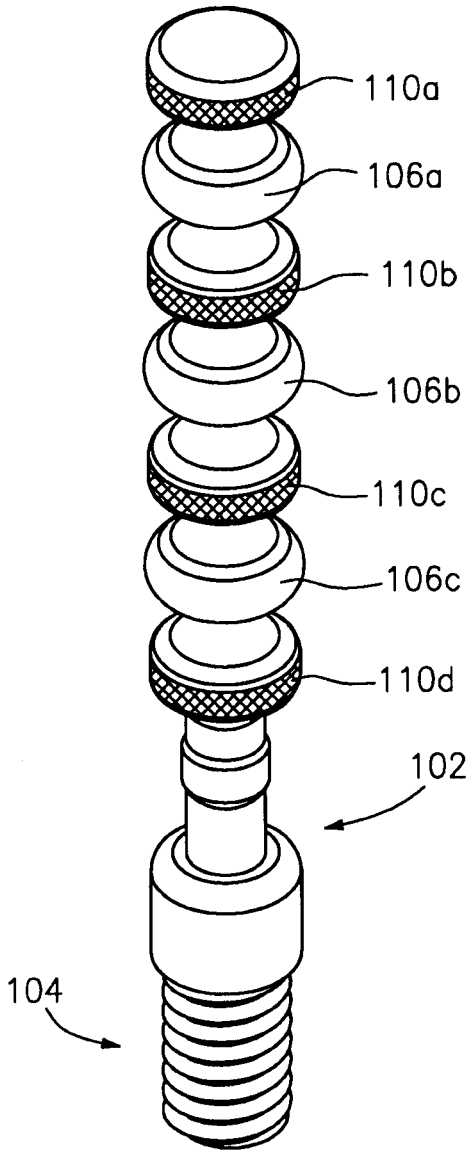
FIG. 3A is a perspective view of a shank depicted in FIG. 2, but without the foam cover.

As shown in the accompanying FIGS. 1, 2, 3A, Applicant's preferred embodiment 100 comprises: a molded plastic shank 102 having a threaded free end 104 and a series of integral parallel rings (e.g., 106a, 106b, 106c); and a foam cover 108, made of polyurethane foam, fixedly attached by thermally bonding.

Rings (e.g., 106a, 106b, 106c) preferably are convex on both sides. They are equally spaced between parallel right-cylindrical spacers (e.g., 110a, 110b, 110c, 110d). The cylinders (e.g., 110a, 110b, 110c, 110d) act as thermal bonding points for the foam cover 108.

Note that the cover 108 is not bonded to the rings (e.g., 106a, 106b, 106c). That allows the rings to move more freely within the cover when the shank 102 bends.

Shank 102 and rings (e.g., 106a, 106b, 106c) are integral. As best shown in FIGS. 2 and 3A, the rings (e.g. 106a, 106b, 106c) are slightly rounded at their tips. They extend beyond the spacers (e.g., 110a, 110b, 110c, 110d).

Figure 3B:
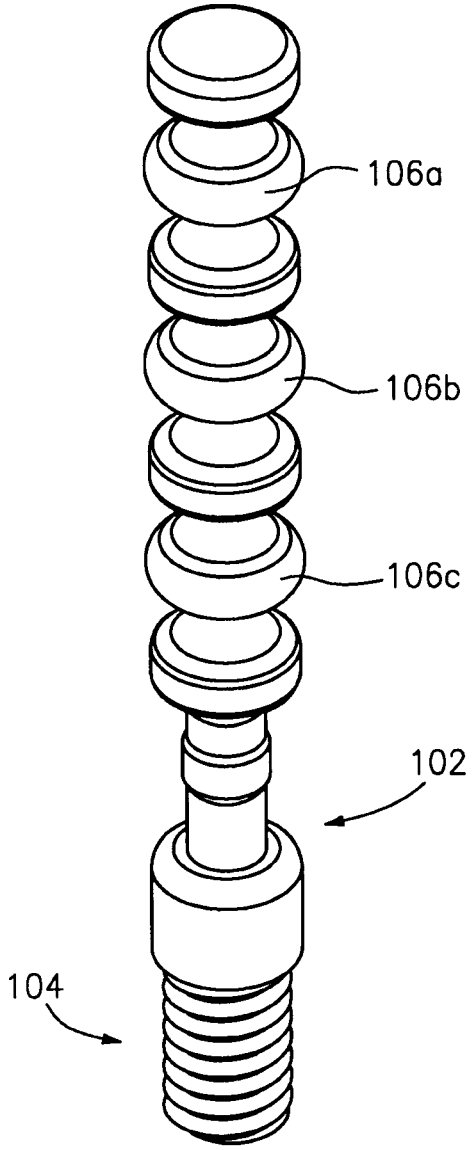
FIG. 3B is a perspective view of the shank before a thermal bonding process attaches the foam cover; [and]
Figure 4A:
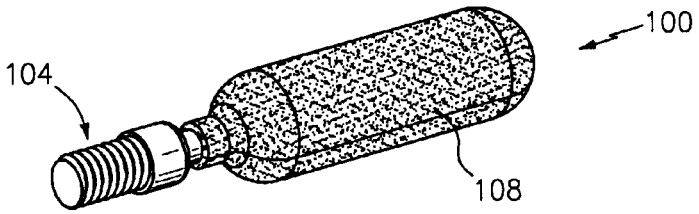
FIGS. 4A-4D depict steps for cleaning and lubricating a firearm bore with Applicant's invention[.]*; and*
Figure 4B:
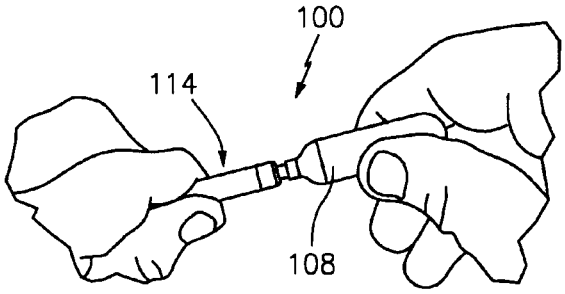
Figure 4C:
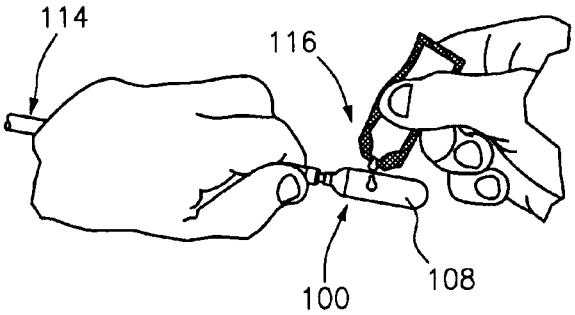
Figure 4D:
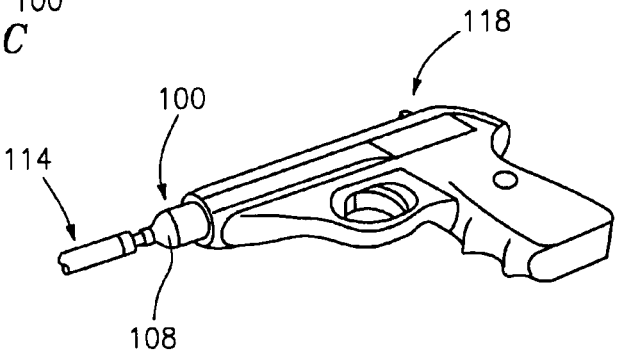

Applicant's Bore-Tips™ swabs are made from a preferred process (not shown). Two sheets of polyurethane are placed over a shank 102. Then the sheets are thermally bonded onto the shank at the spacers (e.g., 110a, 110b, 110c, 110d). Originally the spacers (e.g., 110a, 110b, 110e, 110d) and rings (e.g., 106a, 106b, 106c) look alike and are the same height. See FIG. 3B. The spacers become shortened and knurled during the thermal bonding.

FIGS. 4A-4D depict cleaning and lubricating instructions for Bore-Tips™ swabs 100. As shown, the shank's threaded end 104 is screwed into the tip of a standard gun cleaning rod 114 (see FIG. 4B). Then solvent or lubricant 116 is applied to the foam cover 108 (see FIG. 4C) to aid in cleaning or oiling the firearm, e.g., the hand gun 118 in FIG. 4D.

Though not shown, Bore-Tips™ swabs 100 come in different sizes. Each is designed for specific bore sizes of long guns and handguns (e.g., 9 mm, .22 cal, .243 cal, .30 cal, .40 cal and .45 cal).

Each swab's foam cover 108 is slightly wider than the bore for which it is designed. When the swab 100 is pushed through a bore of a firearm (see FIG. 4D), compression of the foam cover occurs. That compression is limited because of the underlying rings (e.g., 106a, 106b, 106c) and spacers (e.g., 110a, 110b, 110c, 110d). The foam swab 100 therefore provides a tight fit in the bore and loosens residue for the foam cover to absorb. The compressive forces, seeking to expand the compressed foam cover, cause or enable the cover to get into any rifling for cleaning.

The slightly wider foam cover 108, along with the underlying rings (e.g., 106a, 106b, 106c) and spacers (e.g., 110a, 110b, 110c, 110d), constitute "rifling cleaning means" for enabling the cover to get into any rifling (within the bore) for cleaning.

The mid-length of the shank 102 can bend. So can its rings (e.g., 106a, 106b, 106c) and spacers (e.g., 110a, 110b, 110c, 110d) but to a lesser degree. That bending helps the foam-covered rings maneuver into other nooks and crannies, such as those found in the upper receiver of an AR-15 rifle.

Though not part of the invention (and not shown), multiple Bore-Tips™ swabs 100 can be attached to a runner or spline for shipment—in other words, like tree branches attached to a tree trunk.

Some of the advantages of Applicant's invention include: precision cleaning; a tight bore fit; and maximum lubrication. No residue is left behind like the shedding from cotton swabs; and the standard patch is eliminated for cleaning. As an added benefit, the integral foam covers are reusable—they can be cleaned with soap and water. They also can be pre-soaked and used with alcohol.

Less cleaning solution is used with Applicant's Bore-Tips™ swabs. Instead of constantly pouring liquid over a traditional cleaning patch, Applicant's swabs can be soaked once in cleaning solution and if desired dipped for a second time.

Figure 5A:
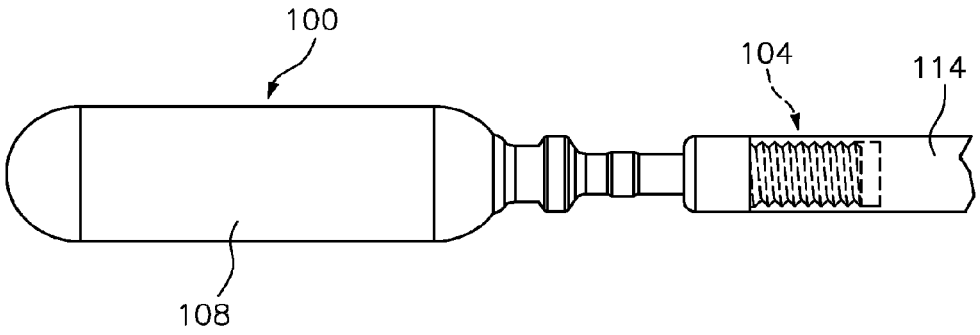
*FIG. 5A is a plan view of the foam swab of FIG. 1 already screwed into a threaded end of a handle, with portions of the handle broken away; and*
Figure 5B:
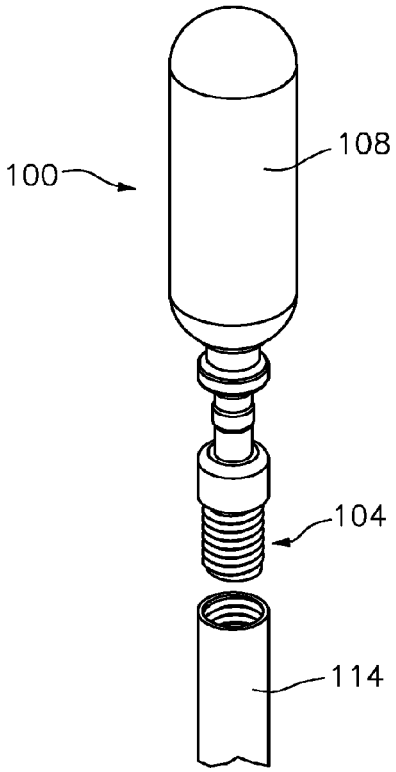
*FIG. 5B is a perspective view of the foam swab and the threaded handle end prior to the swab being screwed into the handle.*

It should be understood by those skilled in the art that obvious structural modifications can be made without departing from the spirit of the invention. For example, Bore-Tips™0 swabs *100* could come already screwed into or otherwise attached to 2-inch, 3-inch, 4-inch, 5-inch, 6-inch, and 9-inch handles *114* (*see, e.g., FIGS. 5A-5B*). In addition, instead of thermal bonding, the cover could be otherwise affixed. Accordingly, reference should be made primarily to the following claims rather than the foregoing Specification to determine the scope of the invention.

What is claimed is:

1. A device to clean a firearm bore comprising:

a. a molded plastic shank having:
   i. parallel rings spaced respectively between parallel spacers along a mid-length of the shank; and
   ii. a threaded free end adapted in size and shape to be screwed into a gun cleaning rod;

b. a polyurethane cover over all the rings and all the spacers, wherein the cover is affixed by thermal bonding to the shank before the device is initially held by an end-user and subsequently used by the end-user to clean the firearm bore;

c. rifling-cleaning means for enabling the device to fit into any rifling within the bore for cleaning, wherein the means comprises:
   i. the polyurethane cover is wider than the bore, prior to the device cleaning the bore, whereby the cover compresses upon the device being placed inside the bore; and
   ii. compression of the polyurethane cover, within the bore, is limited by the rings and spacers; and d. whereby when the device is pushed within the bore:
   i. the device is tightly fit into the bore and loosens residue for the polyurethane cover to absorb; and
   ii. compressive forces, seeking to expand the compressed polyurethane cover within the bore, force the cover to fit into any rifling within the bore for cleaning.

2. The device of claim 1 wherein the polyurethane cover is thermally bonded to the spacers but not the rings to allow the rings to move more freely than the spacers within the cover.

3. The device of claim 2 wherein the spacers extend beyond the shank less than the rings.

4. The device of claim 1 wherein:

a. the spacers are knurled cylinders; and b. the foam cover is affixed by thermal bonding to the knurled spacers but not the rings.

5. A device to clean a firearm bore comprising:

a. a molded plastic shank having:

i. parallel rings spaced respectively between parallel spacers along a mid-length of the shank; and ii. a threaded free end adapted in size and shape to be screwed into a gun cleaning rod;

b. a polyurethane cover over all the rings and all the spacers, wherein the cover is affixed by thermal bonding to the spacers but not the rings, whereby the rings can move more freely than the spacers within the cover;

c. rifling-cleaning means for enabling the device to fit into any rifling within the bore for cleaning, wherein the means comprises:

i. the polyurethane cover is wider than the bore, prior to the device cleaning the bore, whereby the cover compresses upon the device being placed inside the bore; and ii. compression of the polyurethane cover, within the bore, is limited by the rings and spacers;

d. whereby when the device is pushed within the bore:

i. the device is tightly fit into the bore and loosens residue for the polyurethane cover to absorb; and ii. compressive forces, seeking to expand the compressed polyurethane cover within the bore, force the cover to fit into any rifling within the bore for cleaning.

*6. A device to clean a firearm bore comprising:*

*a. handle with an attached swab extending from the handle, wherein the swab comprises:*

*i. a molded plastic shank having parallel rings spaced respectively between parallel spacers along a mid-length of the shank;*

*ii. a polyurethane cover over all the rings and all the spacers, wherein the cover is affixed by thermal bonding to the shank before the device is initially held by an end-user and subsequently used by the end-user to clean the firearm bore with the swab; and*

*iii. rifling-cleaning means for enabling the swab to fit into any rifling within the bore for cleaning, wherein the means comprises:*

*1. the polyurethane cover is wider than the bore, prior to the device cleaning the bore, whereby the cover compresses upon the swab being placed inside the bore; and*

*2. compression of the polyurethane cover, within the bore, is limited by the rings and spacers;*

*b. whereby when the swab is pushed within the bore:*

*i. the swab is tightly fit into the bore and loosens residue for the polyurethane cover to absorb; and*

*ii. compressive forces, seeking to expand the compressed polyurethane cover within the bore, force the cover to fit into any rifling within the bore for cleaning.*

*7. The device of claim 6 wherein the polyurethane cover is thermally bonded to the spacers but not the rings to allow the rings to move more freely than the spacers within the cover.*

*8. The device of claim 7 wherein the spacers extend beyond the shank less than the rings.*

*9. The device of claim 6 wherein:*

*a. the spacers are knurled cylinders; and*

*b. the polyurethane cover is affixed by thermal bonding to the knurled spacers but not the rings.*

*10. A device to clean a firearm bore comprising:*

*a. a handle with an attached swab extending from the handle, wherein the swab comprises:*

*i. a molded plastic shank having parallel rings spaced respectively between parallel spacers along a mid-length of the shank;*

*ii. a polyurethane cover over all the rings and all the spacers, wherein the cover is affixed by thermal bonding to the spacers but not the rings, whereby the rings can move more freely than the spacers within the cover; and*

*iii. rifling-cleaning means for enabling the swab to fit into any rifling within the bore for cleaning, wherein the means comprises:*

*1. the polyurethane cover is wider than the bore, prior to the swab cleaning the bore, whereby the cover compresses upon the device being placed inside the bore; and*

*2. compression of the polyurethane cover, within the bore, is limited by the rings and spacers;*

*b. whereby when the swab is pushed within the bore:*

*i. the swab is tightly fit into the bore and loosens residue for the polyurethane cover to absorb; and*

*ii. compressive forces, seeking to expand the compressed polyurethane cover within the bore, force the cover to fit into any rifling within the bore for cleaning.*

* * * * *